United States Patent
Kistner et al.

(10) Patent No.: US 12,012,083 B2
(45) Date of Patent: Jun. 18, 2024

(54) METHOD FOR MONITORING THE OPERATIONAL RELIABILITY OF A BRAKING SYSTEM IN A VEHICLE

(71) Applicant: Robert Bosch GmbH, Stuttgart (DE)

(72) Inventors: Matthias Kistner, Bretzfeld (DE); Jens Wagner, Untergruppenbach (DE); Oliver Marquardt, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 506 days.

(21) Appl. No.: 17/237,805

(22) Filed: Apr. 22, 2021

(65) Prior Publication Data

US 2022/0017059 A1    Jan. 20, 2022

(30) Foreign Application Priority Data

Jul. 20, 2020 (DE) ......................... 102020209077.7

(51) Int. Cl.
*B60T 17/22* (2006.01)
*B60Q 9/00* (2006.01)
*B60T 7/06* (2006.01)

(52) U.S. Cl.
CPC .............. *B60T 17/221* (2013.01); *B60Q 9/00* (2013.01); *B60T 7/06* (2013.01); *B60T 2220/04* (2013.01); *B60T 2270/406* (2013.01)

(58) Field of Classification Search
CPC ...... B60T 17/221; B60T 7/06; B60T 2220/04; B60T 2270/406; B60T 11/18; B60T 17/22; B60T 7/042; B60T 8/409; B60T 11/16; B60Q 9/00; B60Q 1/441
See application file for complete search history.

(56) References Cited

U.S. PATENT DOCUMENTS

| | | | | |
|---|---|---|---|---|
| 4,916,431 A | * | 4/1990 | Gearey | B60Q 1/441 340/459 |
| 5,890,993 A | * | 4/1999 | Horiguchi | F16H 61/21 477/94 |
| 6,299,261 B1 | * | 10/2001 | Weiberle | B60T 13/74 303/122.04 |
| 9,855,889 B1 | * | 1/2018 | Mullis | B60Q 1/444 |
| 11,700,240 B2 | * | 7/2023 | Max | G06F 21/6254 713/168 |
| 2003/0038715 A1 | * | 2/2003 | Engelman | B60T 8/489 340/439 |
| 2005/0040702 A1 | * | 2/2005 | Yen | B60Q 1/441 303/138 |
| 2007/0222283 A1 | * | 9/2007 | Skinner | B60T 7/20 303/20 |

(Continued)

FOREIGN PATENT DOCUMENTS

| | | | | |
|---|---|---|---|---|
| CN | 106740467 A | * | 5/2017 | ........... B60Q 11/005 |
| CN | 107054333 A | * | 8/2017 | .............. B60T 13/66 |

(Continued)

*Primary Examiner* — Redhwan K Mawari
(74) *Attorney, Agent, or Firm* — NORTON ROSE FULBRIGHT US LLP; Gerard A. Messina

(57) ABSTRACT

In a method for monitoring the operational reliability of a braking system in a vehicle. A brake pedal actuation is monitored via a brake light switch. An error signal is generated if the brake light switch generates a switch signal, without a braking intent of the driver being registered via a sensor signal of a sensor.

14 Claims, 1 Drawing Sheet

(56) References Cited

U.S. PATENT DOCUMENTS

| | | | | |
|---|---|---|---|---|
| 2010/0140063 | A1* | 6/2010 | Jang | B60T 17/22 |
| | | | | 200/61.89 |
| 2010/0280724 | A1* | 11/2010 | Monsere | B60T 17/221 |
| | | | | 701/70 |
| 2011/0130935 | A1* | 6/2011 | Krueger | B60T 7/042 |
| | | | | 701/70 |
| 2013/0169033 | A1* | 7/2013 | Svensson | B60T 11/28 |
| | | | | 303/10 |
| 2014/0129108 | A1* | 5/2014 | Grieser-Schmitz | B60T 13/662 |
| | | | | 701/70 |
| 2016/0114779 | A1* | 4/2016 | Binder | B60T 8/171 |
| | | | | 701/76 |
| 2017/0028906 | A1* | 2/2017 | Beach | B60Q 1/441 |
| 2017/0144598 | A1* | 5/2017 | Jeong | B60Q 11/005 |
| 2018/0178772 | A1* | 6/2018 | Foitzik | B60T 8/4081 |
| 2018/0178773 | A1* | 6/2018 | Foitzik | B60T 13/745 |
| 2018/0334155 | A1* | 11/2018 | Feigel | B60T 8/00 |
| 2020/0001843 | A1* | 1/2020 | Strehle | B60T 7/12 |
| 2020/0130663 | A1* | 4/2020 | Ye | B60T 13/686 |

FOREIGN PATENT DOCUMENTS

| | | | | |
|---|---|---|---|---|
| CN | 110356316 A | * | 10/2019 | |
| CN | 110406518 A | * | 11/2019 | B60L 7/10 |
| WO | 2018108351 A1 | | 6/2018 | |

* cited by examiner

METHOD FOR MONITORING THE OPERATIONAL RELIABILITY OF A BRAKING SYSTEM IN A VEHICLE

CROSS REFERENCE

The present application claims the benefit under 35 U.S.C. § 119 of German Patent Application No. DE 102020209077.7 filed on Jul. 20, 2020, which is expressly incorporated herein by reference in its entirety.

FIELD

The present invention relates to a method for monitoring the operational reliability of a braking system in a vehicle.

BACKGROUND INFORMATION

Conventional hydraulic braking systems in vehicles include two brake circuits for supplying the wheel brake units with hydraulic brake pressure (as described in, e.g., PCT Patent Application No. WO 2018/108351 A1). The brake circuits are connected to a shared main brake cylinder, from which brake fluid is conveyed to the brake circuits upon an actuation of the brake pedal. The main brake cylinder includes an input rod that is displaced upon the actuation of the brake pedal. The pedal travel of the brake pedal is measured with the aid of a pedal travel sensor.

In vehicles that are equipped with this type of hydraulic braking system, a brake light switch is usually also installed, which is designed as an on/off switch and which is switched on by the brake pedal.

SUMMARY

The method according to the present invention is used to monitor the operational reliability of a braking system in a vehicle. The braking system is, in particular, a hydraulic braking system including wheel brake units at the vehicle wheels that are supplied with hydraulic brake fluid for generating a desired braking force upon an actuation of the braking system. The braking system is assigned a brake pedal that is to be actuated by the driver. By actuating the brake pedal, brake fluid is conveyed to the wheel brake units.

In accordance with an example embodiment of the present invention, the vehicle is equipped with a brake light switch that is switched on upon a brake pedal actuation and correspondingly generates a switch signal, thus actuating the brake lights at the vehicle. In the resting or starting state of the brake pedal, the brake light switch is switched off and correspondingly does not generate a switch signal. The brake light switch is preferably adjacent to the brake pedal and is switched on by the brake pedal immediately upon a brake pedal actuation. The brake light switch is preferably designed as an on/off switch.

The braking system includes a mechanical fallback level, which ensures the generation of brake pressure solely with the aid of brake pedal actuation in the case of a failed brake force support in the hydraulic or electrohydraulic manner. To ensure the operational reliability of the mechanical fallback level, the transmission path between the brake pedal and a hydraulic unit in the braking system—usually a main brake cylinder—must be intact. To control the transmission path, the switch signal of the brake light switch may be evaluated according to the present invention in combination with a further sensor signal of a sensor, from which a braking intent of the driver may be deduced. In the case of operational reliability of the transmission path, a switch signal is generated by the brake light switch upon an actuation of the brake pedal. At the same time, the sensor delivers a sensor signal that represents the braking intent of the driver. If the two signals occur at the same time, the operational reliability of the transmission path may be assumed.

If, however, the brake light switch delivers a switch signal, thus indicating an actuation of the brake pedal, without a braking intent of the driver being registered at the same time via the sensor signal of the sensor, an error state must be assumed, in which the transmission path between the brake pedal and the hydraulic unit is not or at least not fully intact. An error signal is generated in this case. The error signal may be displayed to the driver, for example, and/or stored for further evaluation, for example in a repair shop.

In the case of a prevailing switch signal without a simultaneously prevailing sensor signal that registers a braking intent of the driver, there is an inadmissibly large amount of play in the transmission path between the brake pedal and the hydraulic unit of the braking system. In the case of an exclusively mechanical transmission path, the play correspondingly involves a mechanical play or in the case of an interconnected hydraulic transmission unit, it involves air in the transmission path. In any case, the play exceeds an admissible value, thus delimiting the operational reliability of the braking system at least to some extent.

According to one advantageous embodiment of the present invention, the sensor, whose signal is used to ascertain the braking intent of the driver, is a pedal travel sensor, with the aid of which the pedal travel of the brake pedal is measured. An error signal is generated if the brake light switch generates a brake signal and the detected pedal travel is at the same time below a pedal travel limiting value. In this case, a sensor signal may potentially be generated with the aid of the pedal travel sensor, the signal being too weak, however, to indicate a braking intent of the driver. The pedal travel sensor does not deliver a sensor signal that represents a braking intent of the driver until the pedal travel limiting value is exceeded, so that an error is not present if the brake light switch generates a switch signal at the same time.

According to a further advantageous embodiment of the present invention, the brake light switch and the sensor for registering the braking intent of the driver are situated at different positions in the braking system. The brake light switch is preferably adjacent to the brake pedal and is switched on by the brake pedal immediately upon a brake pedal actuation. The sensor for registering the braking intent of the driver may, in contrast, be situated at a distance from the brake pedal, for example at the hydraulic main brake cylinder. The transmission path between the brake pedal and the main brake cylinder includes a possible play that has an effect on the sensor signal of the sensor at the main brake cylinder.

A pedal travel sensor that ascertains the input rod travel at the main brake cylinder comes into consideration as the sensor type. It is alternatively also possible to ascertain the braking intent of the driver with the aid of a pressure sensor that detects the hydraulic brake pressure, it being possible to deduce the braking intent of the driver from the brake pressure increase.

The braking system is equipped with movable rods, for example, via which the brake pedal is connected to the braking system, in particular to the main brake cylinder. The movable rod assembly includes kinematic moving capabilities including one or multiple translatory displacements and/or rotary torsions. As a result of the play in the bearings of the movable rods, the error situation may occur that the brake light switch generates a switch signal, even without a braking intent of the driver being registered via the sensor signal of the sensor.

In the case of movable rods, via which the brake pedal is connected to the braking system, the rods may also potentially deflect the direction of the brake pedal travel. Multiple direction changes may potentially take place with the aid of the rods between the brake pedal and the main brake cylinder.

Alternatively to a mechanical connection via movable rods, a hydraulic connection of the brake pedal to the braking system is also possible. In the case of the hydraulic connection, a further hydraulic cylinder is interconnected, for example.

The present invention further relates to a control unit that is equipped to carry out the above-described method and is used for same. For this purpose, the control unit includes means that are designed to carry out the method, in particular at least one memory unit, at least one processing unit, a control unit input and a control unit output. Sensor information with regard to the brake light switch and the sensor, with the aid of which the braking intent of the driver is ascertained, are suppliable to the control unit via the control unit input. The error signal may be output via the control unit output.

The present invention moreover relates to the above-described hydraulic braking system in a vehicle including the above-described control unit and a sensor, whose sensor signal may be used to deduce a braking intent of the driver. The brake light switch is potentially also assigned to the hydraulic braking system. Alternatively, the brake light switch may also be assigned to a vehicle, in which the hydraulic braking system is installed.

The present invention moreover relates to a computer program product having program code that is designed to carry out the above-described method steps. The computer program product runs in the above-described control unit.

Additional advantages and advantageous embodiments may be derived from the disclosure herein, including the description of the figures, and the figures.

DETAILED DESCRIPTION OF EXAMPLE EMBODIMENTS

Figure 1:
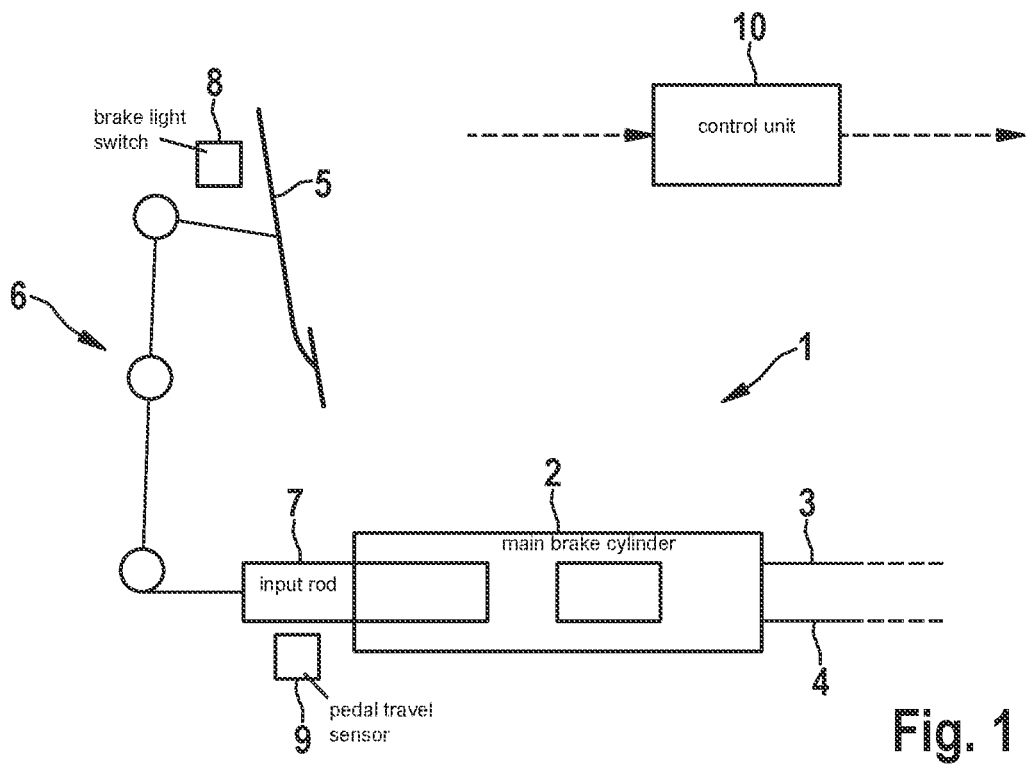
FIG. 1 shows a schematic illustration of a braking system in a vehicle, in accordance with an example embodiment of the present invention.

FIG. 1 shows a hydraulic braking system 1 for a vehicle including a main brake cylinder 2, to which two brake circuits 3 and 4 are connected that are used to supply the wheel brake units at the wheels of the vehicle with hydraulic brake fluid. Braking system 1 includes a brake pedal 5, which is to be actuated by the driver and which the driver uses to predefine his/her braking intent. Brake pedal 5 is coupled to an input rod 7 of main brake cylinder 2 via a transmission unit 6 that is designed as movable mechanical rods. The direction of the brake pedal movement is changed twice toward input rod 7 of main brake cylinder 2 via rods 6 that includes articulated joints and transmission rods.

A brake light switch 8, which is designed as an on/off switch and is switched on upon an actuation of brake pedal 5 resulting in the brake lights of the vehicle lighting up, is situated adjacent to brake pedal 5. If the brake pedal is not actuated, brake light switch 8 is switched off.

Braking system 1 includes a pedal travel sensor 9 that registers an actuation of brake pedal 5 and thus a braking intent of the driver based on a movement of input rod 7 of main brake cylinder 2. Pedal travel sensor 9 continuously measures the movement of input rod 7.

Braking system 1 is moreover equipped with a control unit 10, which is supplied with the sensor signals of pedal travel sensor 9 as the input signals as well as with the instantaneous switching state of brake light switch 8. Control signals for activating the adjustable components of braking system 1 may be generated in control unit 10.

Moreover, a monitoring of the operational reliability of braking system 1 is carried out in control unit 10 on the basis of the instantaneous state of brake light switch 8 as well as of the sensor signals of pedal travel sensor 9. If brake pedal 5 is actuated, brake light switch 8 is switched on. If the brake pedal movement is sufficiently great and, in particular, exceeds a pedal travel limiting value, this may be interpreted as a braking intent of the driver, so that the switched-on state of brake light switch 8 and the braking intent of the driver conform. If, however, brake light switch 8 is switched on, but the detected pedal travel of brake pedal 5 is below the pedal limiting value at the same time, this must be interpreted as an error that occurs as a result of excessive play in rods 6, for example. In this case, an error signal that is displayed to the driver and potentially stored is generated in control unit 10.

Figure 2:
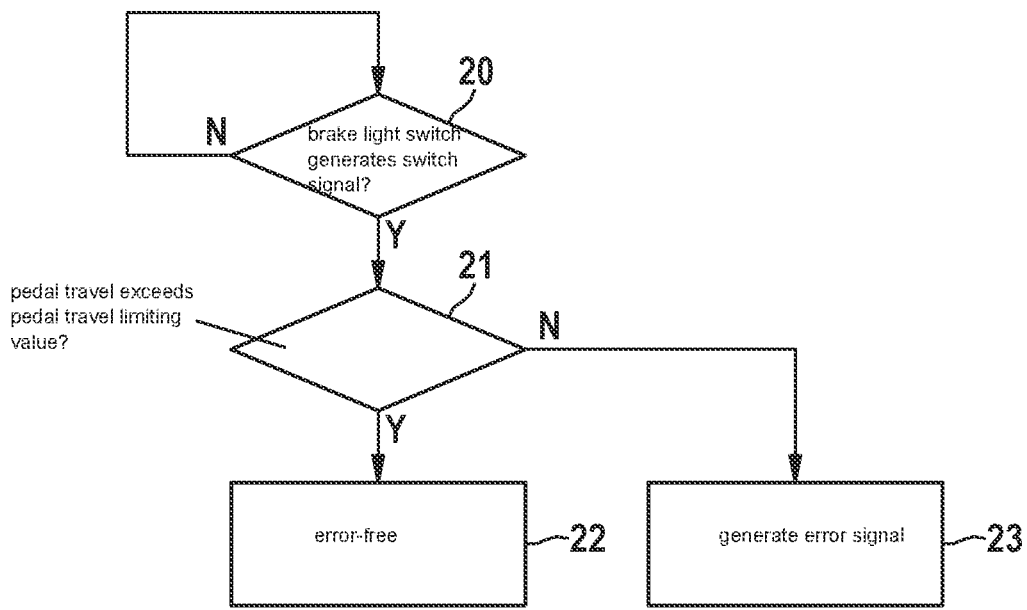
FIG. 2 shows a flowchart for monitoring the operational reliability of the braking system, in accordance with an example embodiment of the present invention.

In FIG. 2, a flowchart including the method steps for monitoring the operational reliability of the braking system is illustrated. In a first method step 20, the query takes place, whether the brake light switch generates a switch signal corresponding to the switched-on state. If this is not the case, following the no branch ("N") it is returned to the start of method step 20 and method step 20 is repeated in cyclic intervals.

If, however, the query results in that the brake light switch is switched on, following the yes branch ("Y") it is advanced to next method step 21, in which it is checked, whether the pedal travel registered by the pedal travel sensor exceeds a pedal travel limiting value. If this is the case, following the yes branch it is advanced to step 22, according to which the braking system is error-free and the operational reliability of the braking system is ensured. In this case, the brake light signal and the sensor signal of the pedal travel sensor conform. The detected pedal travel is sufficiently great for a braking intent of the driver to be deduced.

If, however, the query in method step 21 results in that the pedal travel detected by the pedal travel sensor is below the pedal travel limiting value due to play, for example, following the no branch it is advanced to method step 23, according to which an error signal is generated. In this case, the braking system is in a state having the brake light switch switched on, without a braking intent of the driver having been ascertained. The signals of the brake light switch and of the pedal travel sensor do not conform, so that the operational reliability of the braking system is not ensured and an error signal is generated.

What is claimed is:

1. A method for monitoring operational reliability of a braking system in a vehicle, the method comprising the following steps:

monitoring a brake pedal actuation via a brake light switch;

detecting an error state in a transmission path between the brake pedal and a hydraulic unit of the braking system when the brake light switch generates a switch signal to actuate brake lights of the vehicle, without a braking intent of a driver being registered, via a sensor signal of a sensor, at the same time as the brake light switch generates the switch signal to actuate the brake lights of the vehicle; and generating an error signal based on the detecting of the error state in the transmission path;

wherein the sensor, whose signal is used to ascertain the braking intent of the driver, is a pedal travel sensor, the error state in the transmission path being detected when the brake light switch generates the switch signal actuating the brake lights of the vehicle, and a detected pedal travel of the brake pedal is below a pedal travel limiting value at the same time as the brake light switch gene rates the switch signal to actuate the brake lights of the vehicle.

2. The method as recited in claim 1, wherein the brake light switch and the sensor for registering the braking intent of the driver are situated at different positions in the braking system.

3. The method as recited in claim 2, wherein the brake light switch is situated at or adjacent to the brake pedal and the sensor for registering the braking intent of the driver is situated at or adjacent to an input rod of a main brake cylinder.

4. The method as recited in claim 1, wherein the transmission path includes a connection of the brake pedal via movable rods.

5. The method as recited in claim 4, wherein the braking system is configured to execute at least one direction change of movement of the brake pedal with the aid of the moveable rods toward a main brake cylinder.

6. The method as recited in claim 1, wherein the transmission path includes a hydraulic connection of the brake pedal.

7. A control unit configured to monitor operational reliability of a braking system in a vehicle, the control unit comprising a processor, a memory, an input, and an output, the control unit configured to:

monitor a brake pedal actuation via a brake light switch;

detect an error state in a transmission path between the brake pedal and a hydraulic unit of the braking system when the brake light switch generates a switch signal to actuating brake lights of the vehicle, without a braking intent of a driver being registered, via a sensor signal of a sensor, at the same time as the brake light switch generates the switch signal to actuate the brake lights of the vehicle; and generate an error signal based on the detection of the error state in the transmission path;

wherein the control unit is configured to receive, via the input, the switch signal of the brake light switch for monitoring the brake pedal actuation, and the sensor signal of the sensor for registering the braking intent of the driver;

wherein the sensor, whose signal is used to ascertain the braking intent of the driver, is a pedal travel sensor, the error state in the transmission path being detected when the brake light switch generates the switch signal actuating the brake lights of the vehicle, and a detected pedal travel of the brake pedal is below a pedal travel limiting value at the same time as the brake light switch generates the switch signal to actuate the brake lights of the vehicle.

8. A hydraulic braking system in a vehicle, comprising:

a brake light switch;

a sensor whose sensor signal is used to deduce a braking intent of a driver; and a control unit configured to monitor operational reliability of the braking system in the vehicle, the control unit including a processor, a memory, an input, and an output, the control unit configured to:

monitor a brake pedal actuation via the brake light switch; and detect an error state in a transmission path between the brake pedal and a hydraulic unit of the braking system when the brake light switch generates a switch signal to actuating brake lights of the vehicle, without a braking intent of a driver being registered, via a sensor signal of a sensor, at the same time as the brake light switch generates the switch signal to actuate the brake lights of the vehicle; and generate an error signal based on the detection of the error state in the transmission path;

wherein the control unit is configured to receive, via the input, the switch signal of the brake light switch for monitoring the brake pedal actuation, and the sensor signal of the sensor for registering the braking intent of the driver;

wherein the sensor, whose signal is used to ascertain the braking intent of the driver, is a pedal travel sensor, the error state in the transmission path being detected when the brake light switch generates the switch signal actuating the brake lights of the vehicle, and a detected pedal travel of the brake pedal is below a pedal travel limiting value at the same time as the brake light switch generates the switch signal to actuate the brake lights of the vehicle.

9. A vehicle including a hydraulic braking system, the hydraulic braking system including:

a brake light switch;

a sensor whose sensor signal is used to deduce a braking intent of a driver; and a control unit configured to monitor operational reliability of the braking system in the vehicle, the control unit including a processor, a memory, an input, and an output, the control unit configured to:

monitor a brake pedal actuation via the brake light switch; and detect an error state in a transmission path between the brake pedal and a hydraulic unit of the braking system when the brake light switch generates a switch signal to actuating brake lights of the vehicle, without a braking intent of a driver being registered, via a sensor signal of a sensor, at the same time as the brake light switch generates the switch signal to actuate the brake lights of the vehicle; and generate an error signal based on the detection of the error state in the transmission path;

wherein the control unit is configured to receive, via the input, the switch signal of the brake light switch for monitoring the brake pedal actuation, and the sensor signal of the sensor for registering the braking intent of the driver;

wherein the sensor, whose signal is used to ascertain the braking intent of the driver, is a pedal travel sensor, the error state in the transmission path being detected when the brake light switch generates the switch signal actuating the brake lights of the vehicle, and a detected pedal travel of the brake pedal is below a pedal travel limiting value at the same time as the brake light switch generates the switch signal to actuate the brake lights of the vehicle.

10. A non-transitory computer-readable storage medium on which is stored a computer program having program code for monitoring operational reliability of a braking system in a vehicle, the program code, when executed by a computer, causing the computer to perform the following steps:

monitoring a brake pedal actuation via a brake light switch;

detecting an error state in a transmission path between the brake pedal and a hydraulic unit of the braking system when the brake light switch generates a switch signal to actuate brake lights of the vehicle, without a braking intent of a driver being registered, via a sensor signal of a sensor, at the same time as the brake light switch generates the switch signal to actuate the brake lights of the vehicle; and generating an error signal based on the detecting of the error state in the transmission path;

wherein the sensor, whose signal is used to ascertain the braking intent of the driver, is a pedal travel sensor, the error state in the transmission path being detected when the brake light switch generates the switch signal actuating the brake lights of the vehicle, and a detected pedal travel of the brake pedal is below a pedal travel limiting value at the same time as the brake light switch gene rates the switch signal to actuate the brake lights of the vehicle.

11. The method as recited in claim 5, wherein the error state includes excessive play in the moveable rods.

12. The method as recited in claim 6, wherein the error state includes air in the hydraulic connection of the transmission path.

13. The method as recited in claim 1, wherein the hydraulic unit includes a hydraulic main brake cylinder.

14. The method as recited in claim 1, wherein sensor is a pedal travel sensor, and wherein the error signal is generated when the brake light switch generates the switch signal and the detected pedal travel is below a pedal travel limiting value.

* * * * *